Dec. 25, 1951 P. L. STONE 2,579,878

MOUNTING DEVICE FOR TELEPHONES AND THE LIKE

Filed March 19, 1949 2 SHEETS—SHEET 1

INVENTOR.
PAUL L. STONE
BY
Brown, Denk & Synnestvedt
AGENTS

Dec. 25, 1951 P. L. STONE 2,579,878

MOUNTING DEVICE FOR TELEPHONES AND THE LIKE

Filed March 19, 1949 2 SHEETS—SHEET 2

INVENTOR.
PAUL L. STONE
BY
Brown, Denk & Synnestvedt
AGENTS

Patented Dec. 25, 1951

2,579,878

UNITED STATES PATENT OFFICE 2,579,878

MOUNTING DEVICE FOR TELEPHONES AND THE LIKE

Paul L. Stone, Melrose Park, Pa., assignor to Philco Corporation, Philadelphia, Pa., a corporation of Pennsylvania Application March 19, 1949, Serial No. 82,436

8 Claims. (Cl. 248—313)

This invention relates to mounting apparatus, and is especially concerned with apparatus adapted to mount a variety of devices such, for example, as telephone hand sets. Although of broader applicability, apparatus constructed in accordance with my invention is particularly useful for mounting telephone hand sets in automobiles or other moving vehicles.

It is the primary object of the present invention to provide for secure yet readily releasable retention of devices such as telephone hand sets, the invention being particularly characterized in that it provides for rigid securement of hand telephones in such manner that accidental dislodgement thereof is prevented.

It is a further object of the invention to provide apparatus of this class, which is featured by ruggedness, simplicity and low cost.

An additional important object of this invention resides in the provision of telephone mounting apparatus which is adapted to be moved to either of two positions of adjustment, to provide for securement and release of a telephone instrument, and which will remain in the selected position of adjustment in readiness for re-use.

The foregoing, together with other objects and advantageous constructional features, will be clearly understood from a consideration of the following detailed description, taken in the light of the accompanying drawings, in which.

Figures 1, 4:
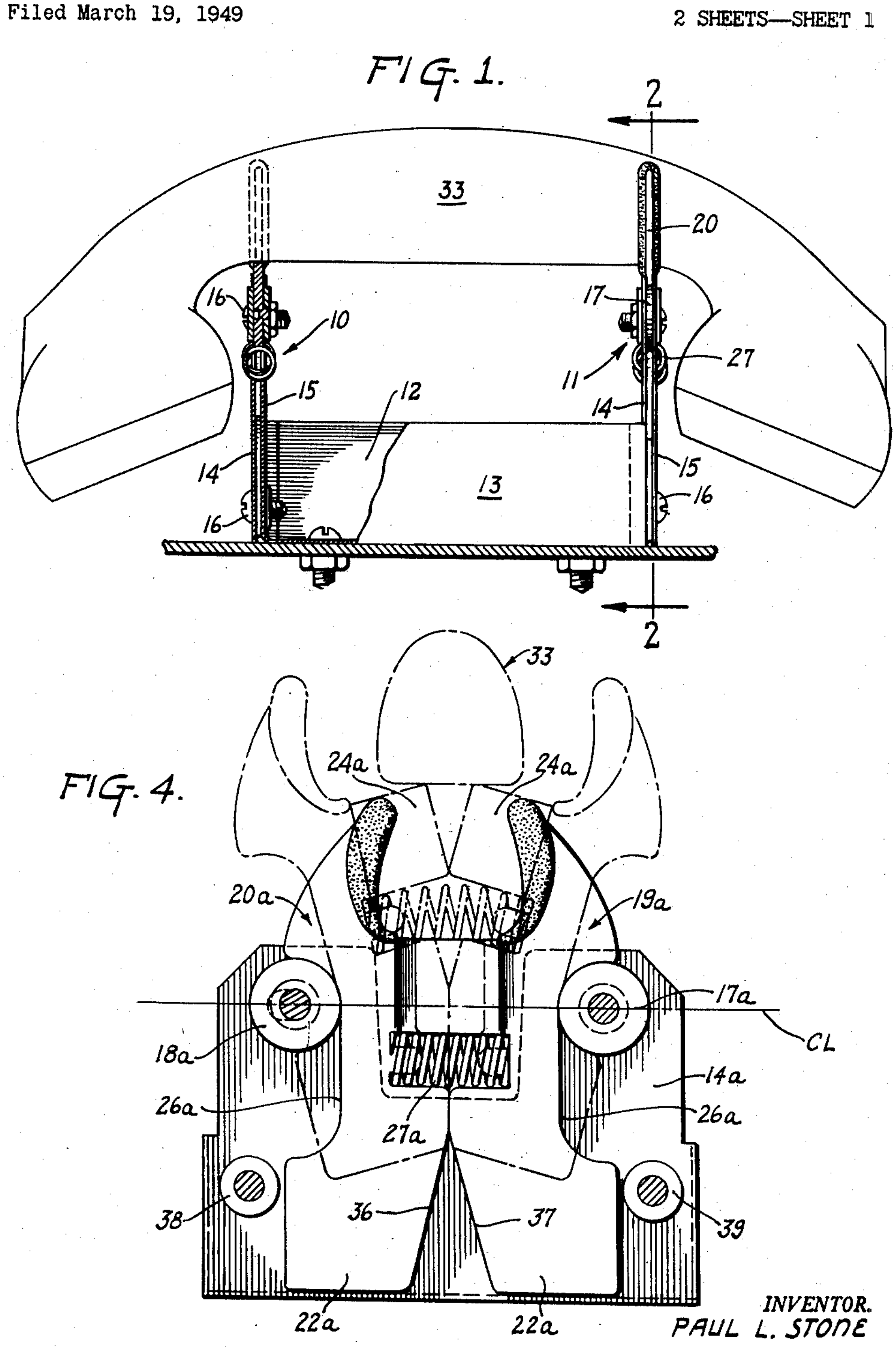
Figure 1 is a side elevational view (a fragmentary portion being in section) illustrating apparatus embodying my invention, and showing said apparatus as providing support for a telephone hand set of conventional type.
Figure 4 is a view similar to Figure 2, and is illustrative of another embodiment of the invention.
Figure 2:
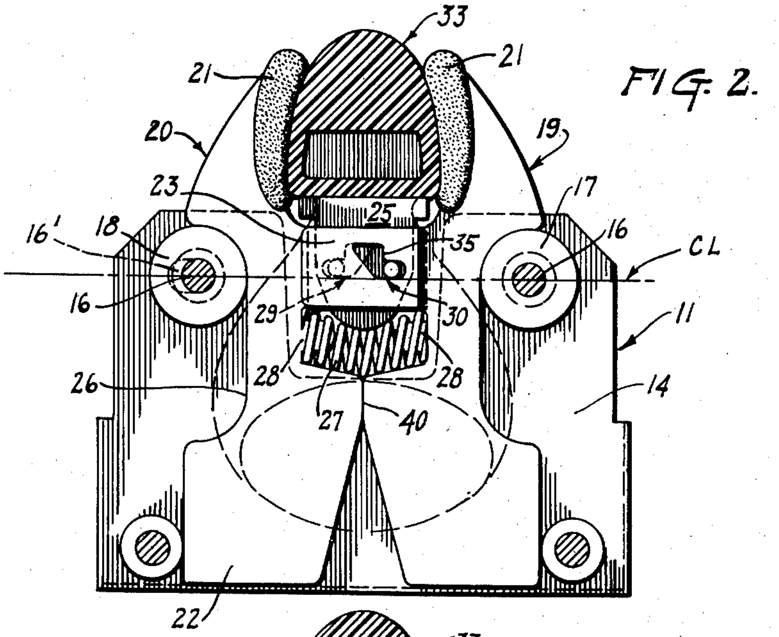
Figure 2 is a sectional view taken as indicated by the line 2—2 of Figure 1.
Figure 3:
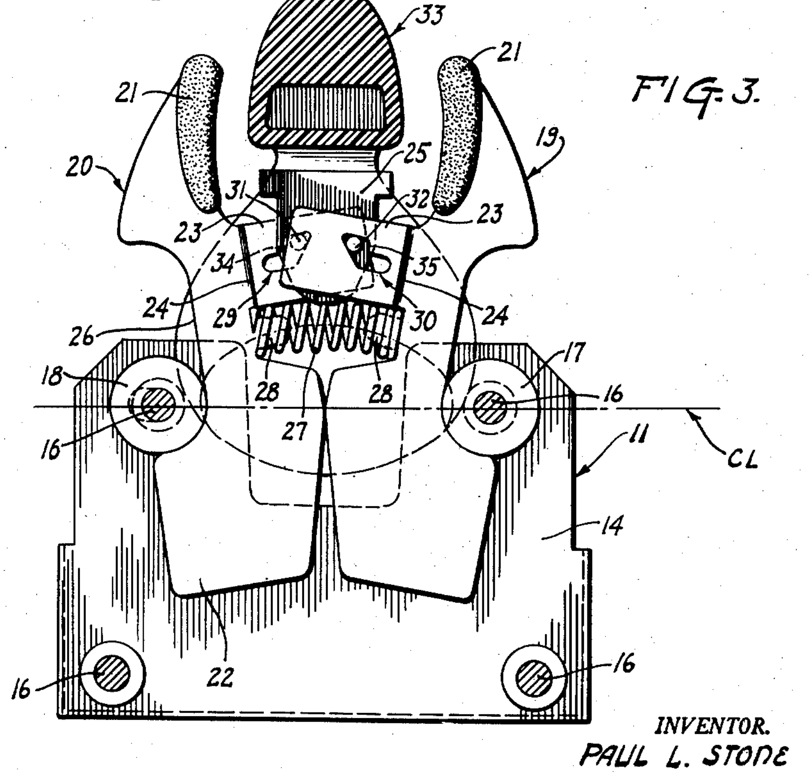
Figure 3 is a view similar to Figure 2, and illustrates the parts of the mechanism in another position of adjustment.

Now making more detailed reference to the drawings, there is illustrated in Figures 1, 2 and 3 one embodiment of the invention, which embodiment comprises a pair of spaced, upstanding securing assemblies designated generally by the reference numerals 10 and 11. The lower portions of the two assemblies are rigidly interconnected by a pair of framing members 12 and 13 which span the distance between said securing assemblies and cooperate therewith to provide a box-like base lending rigidity to the entire structure. The assemblies are identical in both construction and function and, accordingly, detailed description of one thereof will suffice.

Each assembly comprises a pair of wall portions 14 and 15, secured together by convenient means such, for example, as the screws shown at 16 and maintained in slightly spaced relation by means of rollers, washers or the like, two of which are shown at 17 and 18 in Figures 2 and 3. Between these wall portions, and as best seen in Figures 2 and 3, there is disposed a pair of jaw members 19 and 20, these jaw members being slidably received between the wall portions 14 and 15 and being movable from a retracted closed position, shown in Figure 2, to an extended open position as illustrated in Figure 3.

The aforesaid jaw members preferably, and as shown, take the form of simple identical stampings each of which is provided with a padded gripping section 21, a lower generally rectangular guide section 22, and a flange 23 projecting from the jaw member intermediate the ends thereof and extending in the direction of the oppositely disposed jaw member of the pair. As represented at 24, in Figure 3, the flanges 23 are offset from the general plane of the jaw member in order that the two flanges may be brought into face-to-face registry, in the position shown in Figure 2, and in order that they may be spaced sufficiently to accommodate a trigger element 25 slidably received between the flanges. Further reference to this trigger element and to its mode of operation will be made hereinafter.

As clearly appears in Figures 2 and 3, the rollers 17 and 18 serve not only as spacers maintaining the wall portions 14 and 15 in the desired spaced relation, but also provide a pair of spaced points about each of which an associated one of said jaw members may move pivotally during the opening and closing movements of said members. In addition to the pivotal movement aforesaid, said members move slidably between the wall portions, being guided in such movement by cooperation between one of said rollers and a guideway formed in the jaw member. One of said guide-ways is identified by the numeral 26, in each of Figures 2 and 3, and the character and extent of the movement of the jaw members will be clear from a comparison of these two figures.

A spring 27 is disposed to react between the jaw members 19 and 20, opposite ends of this spring being associated with small tabs 28 disposed in generally confronting relation. In accordance with a special feature of this invention and in the manner more fully set forth in what follows, the spring 27 moves over-center, with respect to the line-of-centers CL extending between the screws 16 which mount rollers 17 and 18, such over-center movement taking place during upward and downward (opening and closing) movements of the jaw members. As is more fully considered in what follows, movement of the spring across the aforesaid line-of-centers makes it possible for the spring force to be exerted in such a way that the spring is effective to maintain the jaw members in either open or closed position.

Now making further reference to the trigger element 25, it will be seen (Figure 3) that said trigger element is slidably received between the above-mentioned flanges 23, and has driving connection with said flanges through a pair of guideways 29 and 30 and a pair of pins 31 and 32. Each pin is fixed to and extends from an opposite face of the trigger element 25 and is disposed within a corresponding one of said guideways. The trigger element is, of course, actuated in response to downward pressure on the telephone hand set shown at 33 and serves to initiate closing movement of the jaw members, as will now appear.

In use, the apparatus functions in the following manner.

First making reference to the device in its open condition, that is the condition illustrated in Figure 3, it will be observed that the jaw members 19 and 20 occupy their uppermost position, as determined by the cooperation between the guide surfaces 26 and the associated rollers 17 and 18. In this upper position, the spring 27 reacts between said jaw members above the line-of-centers extended between the rollers 17 and 18, and its force is therefore effective to spread said members to an extent permitted by the lost motion interconnection afforded by guideways 29 and 30 and the cooperating pins 31 and 32 carried by the trigger element 25.

This embodiment of the apparatus of the invention is featured by the fact that the jaw members cannot be inadvertently tripped as a result of being struck on the exteriorly presented surfaces thereof, and in the absence of actuation of the trigger element. It follows therefore, that undesired return of said members to the lower position is prevented. To these ends, the guideways 29 and 30 are provided with small, vertically extending track portions, shown at 34 and 35, respectively. In the event that one of the jaw members is struck in such manner as to tend to move said member inwardly, and thence downwardly, the associated pin (see for example pin 32) is struck by the vertically extending portion 35 of the track 30, and further inward pivotal movement of the jaw member is prevented. In the absence of rather considerable inward movement of the jaw members, downward movement thereof is not possible.

When, however, the telephone instrument is pressed downwardly between the jaw members, contact is first made with the upwardly presented edge of the trigger element 25, with the result that said trigger element is moved downwardly, carrying with it the pins 31 and 32 into the lower portion of guideways 29 and 30. Since the lower portion of each guideway is shaped to provide for considerable lateral sliding movement of the jaw member with respect to the pin, and due to the constraining action which the rollers exert against the surfaces 26, the jaws move inwardly until they engage the handle portion of the telephone instrument. When such engagement has been made, continued downward movement of the hand set is effective to move the jaw members down within the wall portions 14 and 15 until the position shown in Figure 2 is reached. In this position, the spring 27 has moved below the aforesaid line-of-centers, and its force is therefore exerted in such manner as to cause the lower portions of the jaw members to spread, with resultant inward gripping movement of the upper ends of said members. To withdraw the instrument, the hand set is grasped intermediate the two assemblies shown in Figure 1 and is moved upwardly. As will now be understood, the upwardly directed force which the hand set exerts against the inwardly curved gripping portions of the jaw members, serves to move said members upwardly until the spring 27 again passes over the line-of-centers and moves the jaw members to the position shown in Figure 3, maintaining them therein. It is important to note that, in the retacted position, the jaw members are in abutting relation in the region designated 40 in the drawing, and that the span across said members, in the region of the guideways 26, is just equal to the gap existing between the inwardly presented faces of the rollers 17 and 18. It will be appreciated that due to the configuration of the interengaging portions of the telephone handle and the sections 21 of the jaw members (upward force exerted against the telephone instrument results in a very considerable horizontal component which would spread the jaw members and prevent their being drawn to the extended position, if it were not for the constraint afforded by the above-mentioned point of abutment and the width of the gap between the rollers 17 and 18. In order that the proper spatial relation may be established between the two rollers, and having in mind manufacturing tolerances, it is to be noted that the mounting for the roller 18 is such as to permit adjustment of said roller along the line-of-centers. This freedom for adjustment is clear from the drawings, in which connection reference should be made to the slot 16′ shown in Figure 2.

The embodiment of the invention illustrated in Figure 4, is generally similar to that already described, with the difference that in this second embodiment, the trigger element and associated apparatus is not present. The two positions of the components of this second embodiment are illustrated in the figure, in which connection the full line and broken line representations should be compared. Parts corresponding to those of the first embodiment bear similar numerals including the subscript *a*.

The construction and operation of this embodiment may be fully appreciated from a brief consideration of the drawing. It will be noted that in this second embodiment, downward movement of the jaw members takes place as a result of contact of the lower surface of the handle of the telephone instrument against the upwardly presented edges of the flanges 24*a*. It is further to be observed that the inwardly sloping surfaces 36 and 37, provided upon the rectangular guide sections 22*a*, move into contact with one another when the jaw members have moved to their extended, open position, and said surfaces 36 and 37 are thus effective to limit the opening movement of the jaw members under the influence of spring 27*a*. In the event that the jaw members are moved to the retracted position without the telephone instrument mounted therebetween, excessive spreading movement of said members is prevented by contact between the outer edges of the guide sections 22a and the spacing washers 38 and 39.

Whereas the first embodiment described is particularly useful in installations in which protection against inadvertent tripping of the jaw members is of importance, the second embodiment is especially advantageous by reason of its extreme simplicity and the ease with which the parts thereof may be made and assembled.

From the foregoing description it will now be understood that by this invention there is provided apparatus adapted to effect secure yet readily releasable retention of a variety of devices. Actuation of the apparatus is simple and positive, and each embodiment is characterized by the fact that it remains in the selected position of adjustment in readiness for re-use without the need for separately actuated catches or the like.

I claim:

1. Apparatus for releasably retaining telephone hand sets or other devices in a rest position, comprising: a pair of jaw members adapted releasably to engage and support the device; means providing a pair of spaced points about each of which an associated one of said jaw members has rotational movement to provide for opening and closing movements of said members; and resilient means arranged to react against said jaw members and tending to rotate said jaw members about said spaced points, said resilient means being movable, in response to opening and closing movements of said jaw members, over-center with respect to the line-of-centers passing through said pair of spaced points, the construction and arrangement being such that when said resilient means is disposed to one side of said line-of-centers said resilient means is effective to rotate said jaw members in a direction such as to spread the same, and when said resilient means is disposed to the other side of said line-of-centers said resilient means is effective to rotate said jaw members in a direction such as to close the same.

2. Apparatus in accordance with claim 1, and further characterized in that said jaw members also have sliding movement with respect to said points during the said movements between open and closed positions, and that said sliding movement is effective to carry the resilient means over said line-of-centers.

3. Apparatus for releasably retaining telephone hand sets or other devices in a rest position, comprising: support structure; a pair of jaw members slidably carried by said support structure: guide means confining the sliding movements of said jaw members between a position retracted with respect to said support structure and a position of extension with respect thereto; said guide means including structure defining a pair of pivots about which said jaw members may have limited rotational movement during the stated sliding movements thereof; and resilient means arranged to exert force against said jaw members and movable therewith, extension of said jaw members serving to move said resilient means, with respect to said pivot means, to a position in which the force exerted thereby tends to rotate said jaw members about said pivot means in a direction such as to open the same, and retraction of said jaw members serving to move said resilient means to a position, with respect to said pivot means, in which the force exerted thereby tends to rotate said jaw members about said pivot means in a direction such as to close said members.

4. Apparatus in accordance with claim 3, and further characterized in that forcible contact between the device to be mounted and the said jaw members effects retraction of the latter and consequent gripping of the said device, said jaw members being configured embracingly to engage said device in the retracted position.

5. Apparatus for releasably retaining telephone hand sets or other devices in a rest position, comprising: a pair of elongated jaw members adapted releasably to engage and support the device; a pair of pivot means each of which is in contact with an associated one of said jaw members and each of which is disposed intermediate the ends of the elongated jaw member with which it is in contact, said pivot means providing for rotational movement of said jaw members to accommodate opening and closing thereof; and resilient means reacting against said jaw members and tending to rotate the same about the said pivot means, said jaw members and said pivot means also having freedom for relative longitudinal adjustment movements, and said resilient means being disposed to one side of said pivot means in one position of longitudinal adjustment and being disposed to the other side thereof in another position of longitudinal adjustment, said resilient means when disposed to the said one side of said pivot means serving to rotate said jaw members in a direction such as to spread said jaw members, and said resilient means when disposed to the other side of said pivot means serving to rotate said jaw members in a direction such as to close said members.

6. Apparatus in accordance with claim 5, and further including trigger means disposed between said jaw members, and means linking said trigger means with said jaw members, said linking means including abutment means cooperable with said jaw members to prevent inadvertent closing movements of said members in response to forces exerted thereagainst, said linking means further being cooperable with said jaw members to initiate such closing movements in response to force exerted against said trigger means.

7. Apparatus in accordance with claim 1, and further including trigger means disposed between said jaw members, and means linking said trigger means with said jaw members, said linking means including abutment means cooperable with said jaw members to prevent inadvertent closing movements of said members in response to forces exerted thereagainst, said linking means further being cooperable with said jaw members to initiate such closing movement in response to force exerted against said trigger means.

8. Apparatus for releasably retaining telephone hand sets or other devices in a rest position, comprising: a pair of elongated movable members having end portions providing jaw members adapted releasably to engage and support such devices; a pair of fulcrums defining a line-of-centers, each of said members being rotatable about an associated one of said fulcrums and each also being longitudinally movable with respect to said fulcrums and transversely of said line-of-centers, said fulcrums further serving to guide said members during said longitudinal movements; and resilient means reacting against said jaw members and tending to rotate the same about said fulcrums, said resilient means being movable across said line-of-centers in response to the aforesaid longitudinal movements of said members, the rotational movement imparted by said resilient means serving to spread the mentioned end portions of said members to open the jaws when said resilient means lies to one side of said line-of-centers and acting to close the jaws by spreading the opposite end portions of said members when the resilient means lies to the other side of said line-of-centers.

PAUL L. STONE.

REFERENCES CITED

The following references are of record in the file of this patent:

UNITED STATES PATENTS

| Number | Name | Date |
|---|---|---|
| 1,691,155 | Howell | Nov. 13, 1928 |